United States Patent

Catlin et al.

[11] Patent Number: 5,883,233
[45] Date of Patent: Mar. 16, 1999

[54] PAPER DYE

[75] Inventors: Joseph C. Catlin, Hanahan, S.C.; Richard H. Kokel, Wexford, Pa.

[73] Assignee: Bayer Corporation, Pittsburgh, Pa.

[21] Appl. No.: 122,289

[22] Filed: Jul. 24, 1998

[51] Int. Cl.⁶ ............ C09B 35/023; C09B 35/215; D21H 21/28
[52] U.S. Cl. .............. 534/689; 8/919; 162/162
[58] Field of Search ............ 534/689; 162/162; 8/919

[56] References Cited

U.S. PATENT DOCUMENTS

| | | | |
|---|---|---|---|
| 3,672,816 | 6/1972 | Dehnert et al. | 534/689 X |
| 4,266,939 | 5/1981 | Hildreth et al. | 534/689 X |
| 5,495,003 | 2/1996 | Pedrazzi et al. | 534/631 |

FOREIGN PATENT DOCUMENTS

| | | |
|---|---|---|
| 739747 | 10/1996 | European Pat. Off. . |
| 4139302 | 6/1993 | Germany . |
| 5-255625 | 10/1993 | Japan . |

OTHER PUBLICATIONS

Walker et al., Chemical Abstracts, 96:182738 (1982).
H. Zollinger, Color Chemistry (VCH Verlagsgessellschaft, 1991) pp. 164 and 257.

*Primary Examiner*—Fiona T. Powers

[57] ABSTRACT

This invention relates to a dye having the formula (I)

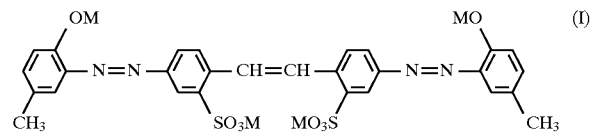

wherein each M is a hydrogen ion, an alkali metal ion, or $R^aR^bR^cR^dN^+$ (where $R^a$, $R^b$, $R^c$ and $R^d$ are independently hydrogen, $C_1$–$C_6$ alkyl, or $C_1$–$C_6$ hydroxyalkyl). This invention further relates to the use of the dye.

6 Claims, No Drawings

PAPER DYE

BACKGROUND OF THE INVENTION

This invention relates to a bleachable dye useful for the manufacture of kraft brown shades of paper and other such substrates.

Azo dyes and fluorescent brighteners derived from diaminostilbene disulfonic acids are known. E.g., H. Zollinger, *Color Chemistry* (VCH Verlagsgessellschaft, 1991), pages 164 and 257.

German Offenlegungsschrift 4,139,302 discloses disazostilbene indicator dyes having the formula

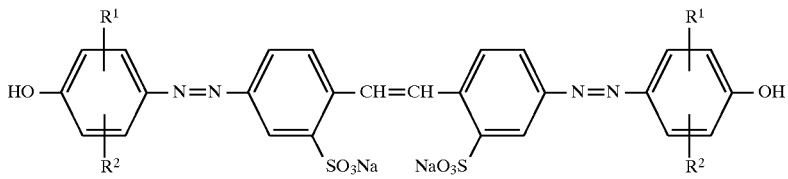

in which $R^1$ and $R^2$ can be hydrogen, halogen, $NO_2$, OH, $NH_2$, or $C_1$–$C_6$ alkyl. Although the $R^1$ and $R^2$ groups can be located at any vacant ring position in the terminal benzene rings, the hydroxyl groups must always be situated para to the azo groups. Compare European Patent Application 739,747 and Japanese Patent 52/55625.

U.S. Pat. No. 5,495,003 discloses disazostilbene dyestuffs of the following general formula

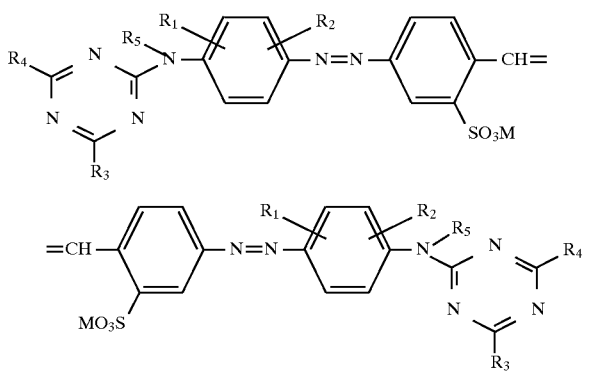

in which $R_1$ to $R_5$ represent various substituents and M represents various cations. In one such compound each $R_1$ is a hydroxyl group located ortho to an azo group. See Example 58. All such compounds, however, must have substituted triazine groups located para to the azo groups. Compare European Patent Application 739,747 and Japanese Patent 52/55625, which also require functional groups other than the ortho-hydroxyl and meta-methyl groups of the present invention.

It has now been found that the disazostilbene dye of the present invention, in which each terminal benzene ring is substituted with a hydroxyl group in a position ortho to an azo group and a methyl group in a position meta to an azo group, can be used in solution as a paper dye that imparts a dull yellow color, commonly referred to as "tan-kraft" color. The dye of the present invention not only provides this distinctive color without being mixed with other dyes but also exhibits minimal shade sensitivity to changes in pH over the range typical for papermaking and thus can be used even for dyeing alkaline-sized paper, for which known dyes such as C.I. Direct Yellow 4 are unsuitable. The dye of the invention is also stable when stored in solution and exhibits excellent bleachability in chlorine-containing bleaching agents such as those used in waste paper recovery. This unique combination of properties has not previously been attainable with known dyes.

SUMMARY OF THE INVENTION

This invention relates to a dye having the formula (I)

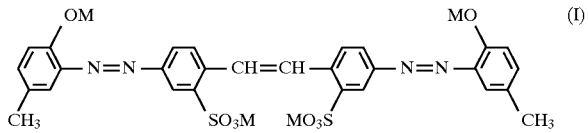

wherein each M is a hydrogen ion, an alkali metal ion (preferably potassium ion), or $R^aR^bR^cR^dN^+$ (in which $R^a$, $R^b$, $R^c$, and $R^d$ are independently hydrogen, $C_1$–$C_6$ alkyl, or $C_1$–$C_6$ hydroxyalkyl). This invention further relates to the use of this dye for coloring paper and other such substrates.

DETAILED DESCRIPTION OF THE INVENTION

The dye of the present invention can be prepared as the free acid (i.e., where each M is a hydrogen ion) or as various alkali metal or ammonium salts (in which one or more M is an alkali metal or ammonium ion). Suitable alkali metal salts include lithium, sodium, and potassium salts, preferably where all four M are potassium ions.

The term "$C_1$–$C_6$ alkyl" as used in the description of $R^a$, $R^b$, $R^c$, and $R^d$ refers to straight or branched chain aliphatic hydrocarbon groups having from 1 to 6 carbon atoms. Examples of $C_1$–$C_6$ alkyl are methyl, ethyl, propyl, butyl, pentyl, hexyl, and the isomeric forms thereof. The term "$C_2$–$C_6$ hydroxyalkyl" refers to straight or branched chain aliphatic hydro-carbon groups having from 2 to 6 carbon atoms and substituted with a hydroxy group. Examples of $C_2$–$C_6$ hydroxyalkyl are hydroxyethyl, hydroxypropyl, hydroxybutyl, hydroxypentyl, hydroxyhexyl, and isomeric forms thereof.

The dye of the present invention can be prepared by known azo coupling methods. In a preferred method, the diazonium salt of flavonic acid having the formula (II)

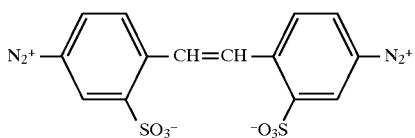

is coupled with p-cresol having the formula (III)

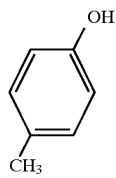

The diazonium salt of formula (II) can be prepared using known diazotization methods from the corresponding diamine, flavonic acid. In a particularly useful diazotization method, flavonic acid is diazotized in water containing a nitrite salt (preferably an alkali metal nitrite such as sodium nitrite) and a mineral acid (preferably hydrochloric acid). Diazotizations according to this preferred method are typically carried out at temperatures of less than about 40° C. (preferably about 5° C. to about 40° C.), although it is possible to use temperatures somewhat outside this range.

The resultant diazonium salt is then coupled in aqueous medium with p-cresol in the presence of a suitable base. Although phenols ordinarily react at a position para to the hydroxyl group (e.g., such as described in German Offenlegungsschrift 4,139,302), p-cresol has a methyl group at the para position and thus instead reacts at a position ortho to the hydroxyl group. Suitable bases for coupling are those which provide a basic environment but which do not otherwise react with the reactive species of the coupling reaction. The preferred base is an alkali metal hydroxide, most preferably potassium hydroxide. If an ammonium salt is to be prepared, the base is typically an amine (such as $R^aR^bR^cN$, wherein $R^a$, $R^b$, and $R^c$ are defined as above) or a quaternary ammonium hydroxide (such as $R^aR^bR^cR^dN^+$ $OH^-$, wherein $R^a$, $R^b$, $R^c$, and $R^d$ are defined as above). The azo coupling reaction is preferably carried out at temperatures of less than about 30° C. (preferably about 10° C. to 30° C.), although it is also possible but less preferred to use temperatures somewhat outside this range. When using an alkali metal hydroxide, a tertiary amine of the formula $R^aR^bR^cN$, or a quaternary ammonium hydroxide of the formula $R^aR^bR^cR^dN^+$ $OH^-$ as the base, the resultant solution can be used directly or can be further processed, for example, by concentration or dilution, before being used as a dye. Other bases (such as other inorganic metal hydroxides) can be used but are much less preferred because the resultant solution must be further processed, for example, by exchange of the cations or by derivatization, to obtain the desired amine salts.

The dye of the present invention can be used to impart color to a variety of substrates but is particularly useful for dyeing and printing paper, paperboard, and cardboard, as well as other cellulosics for which a "tan-kraft" color is desired. Particularly suitable substrates include, for example, bleached, sized, or unsized lignin-free paper, for which the starting material can be bleached, semi-bleached, or unbleached pulp, and recycled and deinked fibers. Other cellulosic fibers can also be colored by the dye of the present invention. The dye can be applied by any of several methods known in the art, preferably by application to a pulp in water suspension but also by surface dyeing, coating, or printing.

Application to pulp in a water suspension (also called "internal dyeing") can be performed by batch addition to a holding tank or "hydra-pulper", which generally provides excellent agitation. Batch addition is performed manually by weighing or volumetrically measuring the dye into the pulp containing vessel. The dye of the present invention can also be added continuously to a flow of pulp in water by means of a metering device such as a gear or piston type pump.

Surface dyeing can be performed, for example, on a paper machine with a set of rollers known as a "size press." These rolls form a nip with the sheet of paper traveling between them. A pond of size press liquor, which generally contains starch and other additives as well as the dye, is metered to both sides of the sheet. The liquor is absorbed onto the surface of the sheet, thus imparting a color to the sheet. Surface coloring is often used in combination with internal dyeing techniques.

Coating coloring can be applied by any of several methods on-line to or off-line from a paper machine. Coating slurries typically comprise a pigmented filler (such as clay or titanium dioxide), a latex binder, colorants (such as the dye of the present invention), and other known additives to enhance the coating performance. The coating mixture is typically applied to the sheet, generally using a roller covered with the coating mixture, and the excess is scraped off with a blade.

Printing can be carried out using any of several known methods to obtain decorative designs or mass surface coverage. The dye of the present invention, for example, can be mixed with other additives, such as binders and lubricants, and applied to a sheet surface using any of several known printing techniques, such as flexographic printing.

Suitable additives and auxiliaries known in the art can, of course, also be used in conjunction with such application methods. As used herein, the term "additives" refers to substances that aid the dye of the present invention in bonding to the various substrates. As used herein, the term "auxiliaries" refers to substances that are compatible with the dye of the present invention and aid in the effective production of various grades of paper. Certain substances, of course, can serve as both additives and auxiliaries. Many additives and auxiliaries are useful in more than one of the above-mentioned application techniques. In practice, however, a narrower group of additives and auxiliaries is typically used for each application method.

For internal dyeing, for example, suitable additives include rosin size, aluminum sulfate, fixing agents (such as amine condensate-type products), retention aids, and inorganic salts (such as sodium chloride). Suitable auxiliaries for internal dyeing include alkenyl succinic anhydride, alkyl ketene dimer, fiber retention aids, wet-strength resins, biocides, and defoamers.

For surface coloring (for example, using a size press), suitable additives include starch and surface active agents (surfactants). Suitable auxiliaries for surface coloring include alkenyl succinic anhydride, and biocides.

For coating coloring, suitable auxiliaries include fillers (such as clay, titanium dioxide, calcium carbonate, and the like), latices, lubricants, gloss enhancers, and defoamers.

For printing, suitable additives include binders, fixing agents, lubricants, humectants, and viscosity controlling agents.

Other suitable additives and auxiliaries would, of course, be known to those skilled in the art.

The following examples further illustrate details for the preparation and use of the compounds of this invention. The invention, which is set forth in the foregoing disclosure, is not to be limited either in spirit or scope by these examples. Those skilled in the art will readily understand that known variations of the conditions and processes of the following preparative procedures can be used to prepare these compounds. Unless otherwise noted, all temperatures are degrees Celsius and all percentages are percentages by weight.

EXAMPLES

Performance Parameters

Performance parameters were obtained for the dyes of Examples 1–4 using acid and alkaline dyeings.

Acid dyeings: Pulp mixtures were prepared by stirring 3 g (dry weight) of bleached, softwood kraft pulp in 100 ml of water artificially hardened to 200 ppm with calcium chloride. To the pulp slurry was added 1.0% (based on the dry weight of fiber) of an appropriate standard dye or an equivalent amount (as determined by the transmission spectral method described below) of a test dye. The dyed pulp mixture was stirred for two minutes, after which was added 4.0 ml of a 0.88% solution of Pexol rosin size solution. After the slurry was stirred for an additional five minutes, 10.0 ml of a 1.5% aluminum sulfate solution was added to the slurry. The dyed pulp mixture was stirred for twenty minutes, then further diluted with 100 ml of artificially hardened water and poured into a TAPPI sheet mold half filled with deionized water. A paper sheet was formed as the water was drained from the mold through the forming screen located at the bottom of the TAPPI mold. The resultant sheet was pressed between blotters, placed on a chrome backing plate, and placed in a drying ring for drying in an oven at approximately 90° C. The dried sheets are then compared for color strength and shade difference.

Alkaline dyeings: Pulp mixtures were prepared by stirring 3 g (dry weight) of bleached, softwood kraft pulp in 100 ml of water artificially hardened to 200 ppm with calcium chloride. A 3% calcium carbonate suspension (10 ml) was added to the pulp mixture, which was then allowed to mix for five minutes. To this pulp slurry was added 1.0% (based on the dry weight of fiber) of an appropriate standard dye or an equivalent amount (as determined by the transmission spectral method described below) of a test dye. The dyed pulp slurry was stirred for fifteen minutes, after which 2 ml of a 0.3% solution of alkyl ketene dimer sizing agent (available as Hercon 70 from Hercules) were added to the pulp mixture. After the mixture stirred for an additional five minutes, the slurry was further diluted with 100 ml of hardened water, stirred for an additional two minutes, and poured into a TAPPI sheet mold half filled with deionized water. A paper sheet was formed as the water was drained from the mold through the forming screen located at the bottom of the TAPPI mold. The resultant sheet was pressed between blotters, placed on a chrome backing plate, and placed in a drying ring for drying in an oven at approximately 90° C. The dried sheets were then compared for color strength and shade difference.

Performance parameters for the dye of the invention prepared according to Example 1 were determined using the following standards (all available from Bayer Corporation):

Standard A: PONTAMINE® Yellow GXG Liquid (Colour Index Direct Yellow 11)

Standard B: PONTAMINE® Billiant Paper Yellow Liquid (Colour Index Direct Yellow 4)

Performance parameters for the dye of Example 1 of the invention were also compared to comparison dyes of Examples 2 and 3.

The relative color strengths of the dyes of the examples and the standard dyes were used when comparing their color properties. Transmission spectra were obtained for known dilutions of each test dye and standard over a range of about 300 to 700 nm. Because the molar concentrations of the dyes of Examples 1–3 were not determined, their molar extinction coefficients (i.e., absolute absorbances) are not known. However, comparison of the relative absorbances at the absorption maximum ($\lambda_{max}$) of each dye and standard were used to determine the relative amounts of each dye and corresponding standard that should be applied to the paper samples to obtain dyed samples having similar reflectance strengths. In particular, the relative absorbances at the absorption maximum ($\lambda_{max}$) of each dye and standard were compared to determine the relative amounts of each dye and corresponding standard that should be applied to the paper samples to obtain dyed samples having similar reflectance strengths.

Sample sheets of dyed bleached kraft paper were prepared as described above using 1% solutions of appropriate dye standards and the indicated amounts of the dyes of Examples 1–3 (for which the quantities were adjusted as described above to account for the difference in relative light absorbances of the dye solutions). The dyed paper sheets were compared to determine reflectance color strengths (by visual evaluation and instrument measurements) and shade (by visual evaluation and instrument measurements), lightfastness (by visual evaluation), and bleachability (by visual evaluation) using the methods described below. In addition, two-sidedness was determined by the visual evaluation method described below.

Reflectance color strength a. Visual

The dyed sheets were viewed under a standard light source (MacBeth light booth equipped with a D65 light source). The observed strength of each test dye is reported relative to a standard (listed in each table as parts).

b. Instrument

The dyed sheets were analyzed using a color measuring device (Data Color Systems, ACS model CS-5). The instrument measures the absorbance at $\lambda_{max}$ for each sheet and (using the Kubelka-Munk K/S equation) automatically calculates the difference in color strength between sheets dyed with a test dye and those dyed with a standard. The results are reported in each table as parts.

Shade a. Visual

The dyed sheets were examined visually under the same conditions as described above for visual color strength. Any difference in shade is reported using standard coloristic difference terms used to describe shade and brightness/dullness. The difference terms are based on the AATCC Gray Scale and are reported as follows:

| Yellow dyes | |
|---|---|
| Trace red | Trace green |
| Slight red | Slight green |
| Distinct red | Distinct green |
| Considerable red | Considerable green |
| Much red | Much green |
| Off-shade red | Off-shade green | b. Instrument

The color measuring device described above for reflectance color strength provided color readings in both the CIELAB measuring system and the CIE CMC(2:1) system for dyed paper sheets. In the CIELAB system, the term L* refers to lightness, for which a higher value is a lighter color and a lower value is a darker color; the term a* corresponds to redness (positive values) or greenness (negative values); the term b* corresponds to yellowness (positive values) or blueness (negative values); the term C* refers to chroma, an indication of the color saturation and is calculated as the square root of the sum of the squares of a* and b*; and the term h refers to hue. Results are reported in terms of the difference (i.e., delta values) between the corresponding L*, a*, b*, C*, and h values of sheets dyed with the test dyes and with corresponding values of the standards. In the CIE CMC(2:1) system, the term L* refers to lightness, for which a higher value is a lighter color and a lower value is a darker color; the term C* refers to chroma, an indication of the color saturation; and H* refers to hue. Results are reported in terms of the difference (i.e., delta values) between the corresponding L*, C*, and H* values of sheets dyed with the test dyes and with corresponding values of the standards. Differences between delta values for acid dyeings and the corresponding alkaline dyeings are reported as "Δ values", for which values near zero indicate shade stability to changes in pH.

Lightfastness

Lightfastness was determined using the general method of AATCC Test Method 16E-1993. Covered strips of dyed paper sheets were placed in a fade-ometer and a portion of each strip was exposed to the light source for a period of several hours, during which time the strips were examined periodically. Exposure to light was continued until the exposed portion of the strips exhibited a noticeable fading of color approximating a "Distinct" rating on the MTCC Gray Scale. The exposure time (in hours) needed to produce this degree of fading is reported in the tables.

Lightfastness results are also described in terms of changes in hue. An "on-shade break" indicates a faded condition that is the same shade, or hue, as the original unfaded dyeing. An "off-shade break" indicates a faded condition that is a different hue from the original unfaded dyeing.

Bleachability

Bleaching tests were used to determine the amount of color removed from dyed paper using sodium hypochlorite. For each test, sample sheets were re-pulped by blending vigorously in water. The pulp was collected on a screen and suspended in a container using sufficient water to form a 4% suspension of pulp. Separate samples were treated at 60° C. for 30 minutes with 4% sodium hypochlorite (or the equivalent required to provide 2% available chlorine) at about pH 10. The bleached pulp samples were then poured into a TAPPI sheet mold half filled with deionized water. The paper sheet that formed as the water drained from the mold through the forming screen located at the bottom of the sheet mold was pressed between blotters and dried at about 93° C. on an electric drum-type dryer. The resultant dyed sheets were compared to unbleached paper sheets for color strength. Samples having less color remaining are considered more bleachable. Results are reported in the tables either as percent color remaining relative to the dyed, unbleached samples or as visual descriptions according to the following scale:

| Rating | Color Remaining |
| --- | --- |
| Unbleachable | 81% to 100% |
| Partially bleachable | 21% to 80% |
| Practically bleachable | 6% to 20% |
| Bleachable | 0% to 5% |

Two-sidedness

Shorter paper fibers and fillers (such as clay or titanium dioxide) tend to concentrate more heavily on one side (top side) of a sheet of paper. Consequently, the two sides can exhibit different properties. For example, the two sides of a sheet of paper are generally termed the top side (or felt side) and the bottom side (or wire side). Two-sidedness is the property of certain dyes to color more heavily either the longer fibers or the shorter paper fibers and/or fillers. The following method was used to determine two-sidedness for the dyes of Examples 1–3.

Five-gram pulp mixtures containing dyes were diluted to one liter and divided into equal portions. One portion was diluted to one liter and pulled under vacuum through a round mold fitted with a 100/120 mesh screen. This sheet was removed from the mold and labeled the wire side. The second portion was also diluted to one liter and pulled under vacuum through a round mold. The filtrate obtained from both filtrations was then poured carefully through the second sheet so as not to form a hole in the sheet. The second sheet was removed from the mold and labeled the felt side. The two sheets were then dried at about 93° C. on an electric drum dryer and compared for relative color strength. A dye was considered wire- or bottom-sided if the first sheet was more heavily colored and felt- or top-sided if the second sheet was more heavily colored (see tables). Top-sidedness is generally considered a desirable property for alkaline dyeing, which is the prevalent method now being used in U.S. paper mills.

Preparation of Diazonium Precursor

A mixture of 74.1 g (0.20 mol) of flavonic acid in 330 mL of water was stirred to a smooth slurry that was solubilized by addition of 31.9 g of 50% aqueous sodium hydroxide, which gave a pH of 6.8–7.2. The free flavonic acid was reprecipitated from the alkaline solution by slow addition of hydrochloric acid and cooled to 20° C. by the addition of ice. To the cooled flavonic acid was added 56 mL of 40% aqueous sodium nitrite over a period of one hour. The resultant mixture was then stirred for two hours at a temperature of no more than 35° C. Excess nitrite was decomposed by the addition of 0.4 g of sulfamic acid and the resultant bisdiazonium salt of flavonic acid was isolated by filtration and washed until neutral to Congo Red test paper. The diazonium salt filtercake was used for the examples without further purification.

Example 1

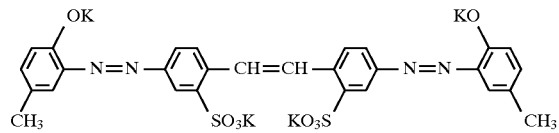

The bisdiazonium salt of flavonic acid prepared from 0.20 mol of flavonic acid as described above was slurried in 240 ml of water and then added evenly over a period of thirty minutes to a mixture of 102.2 g (0.82 mol) of 45% potassium hydroxide, 50.4 g (0.42) of 90% p-cresol, and 240 g of ice, during which time the temperature was allowed to warm to about 18° C. An additional 23 g (0.18 mol) of 45% potassium hydroxide was added and the mixture was stirred for a further two hours. The mixture was clarified by passing through a glass fiber filter. The clarified solution contained 860 g of the dye. Spectroscopic analysis of the dye solution indicated a broad $\lambda_{max}$ at about 435 nm with weak shoulders at about 380 nm and about 455 nm.

Bleached kraft paper dyed by the methods described above exhibited a dull yellow color.

Performance data for the dye of Example 1 of the invention and Standards A and B are shown in Table 1. (Because of severe color changes in alkali, Standard B is unsuitable for use in alkaline dyeing and was not tested.) Performance data for the dye of Example 1 of the invention and comparison Examples 2 and 3 are shown in Table 2.

TABLE 1

Comparison of the dye of Example 1 of the invention with Standards A and B

|  | Acid Dyeings | | | Alkaline Dyeings | |
| --- | --- | --- | --- | --- | --- |
|  | Example 1 | Standard A | Standard B | Example 1 | Standard A |
| Dye strength (parts) | 100 | 100 | 43 | 100 | 110 |
| Dye level (%) | 10.0 | 10.0 | 4.3 | 10.0 | 11.0 |
| Visual |  |  |  |  |  |
| Strength (parts) | 100 | 100 | 100 | 100 | 100 |
| Shade | — | cons. green slight bright | much green much bright | — | much green equal |
| Reflectance |  |  |  |  |  |
| Strength (parts) | 100 | 102.2 | 102.7 | 100.0 | 100.2 |
| Shade (CMC (2:1)) |  |  |  |  |  |
| $\Delta L^*$ | — | 2.11 | 2.88 | — | 2.23 |
| $\Delta C^*$ | — | 3.29 | 4.47 | — | 4.10 |
| $\Delta H^*$ | — | 6.04 | 10.13 | — | 6.34 |
| Lightfastness (hrs. to break) | 2 | 1 (off-shade break) | Not tested | 1 | 1 (off-shade break) |
| Bleachability (% color remaining) | 4.2 | 62.3 | 5.5 | 5.0 | 75.6 |

Example 2 (comparison)

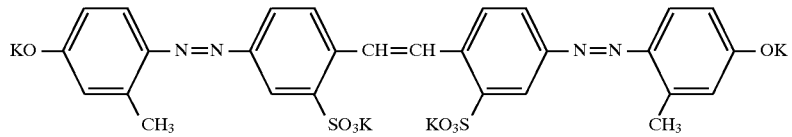

The method of Example 1 was repeated except for using 99% m-cresol instead of p-cresol and only the first addition of potassium hydroxide. Spectroscopic analysis of the resultant dye solution indicated a sharp $\lambda_{max}$ at about 413 nm.

Bleached kraft paper dyed by the methods described above exhibited a bright, greener shade yellow color than paper dyed with the dye of Example 1 of the invention.

Performance data are shown in Table 2.

Example 3 (comparison)

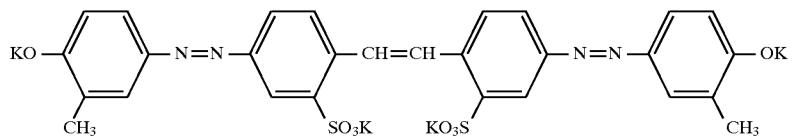

The method of Example 1 was repeated except for using 99% o-cresol instead of p-cresol and only the first addition of potassium hydroxide. Spectroscopic analysis of the resultant dye solution indicated a sharp $\lambda_{max}$ at about 411 nm.

Bleached kraft paper dyed by the methods described above exhibited a bright, distinctly greener yellow color than paper dyed with the dye of Example 1 of the invention.

Performance data are shown in Table 2.

TABLE 2

Comparison of the dye of Example 1 of the invention with the dyes of comparison Examples 2 and 3

| | Acid Dyeings | | | Alkaline Dyeings | | |
|---|---|---|---|---|---|---|
| | Example 1 | Example 2 (comparison) | Example 3 (comparison) | Example 1 | Example 2 (comparison) | Example 3 (comparison) |
| Dye strength (parts) | 100 | 53 | 63 | 100 | 60 | 68 |
| Dye level (%) | 10.0 | 5.0 | 6.0 | 17.6 | 10.0 | 12.0 |
| Visual | | | | | | |
| Strength (parts) | 100 | 105 | 105 | 100 | 105 | 100 |
| Shade | — | cons./much green slight bright | much green much bright | — | cons./much green trace bright | much green slight bright |
| Reflectance | | | | | | |
| Strength (parts) | 100 | 107.4 | 102.5 | 100.0 | 103.7 | 111.7 |
| Shade (CIELAB)[(1)] | | | | | | |
| L* | 79.8 | 86.2 | 86.6 | 78.8 (Δ −1.0) | 83.3 (Δ −2.9) | 85.1 (Δ −1.5) |
| a* | 15.0 | 8.1 | 6.7 | 15.1 (Δ 0.1) | 12.9 (Δ 4.8) | 9.0 (Δ 2.3) |
| b* | 42.0 | 51.4 | 53.2 | 43.2 (Δ 1.2) | 50.2 (Δ −1.2) | 51.4 (Δ −1.8) |
| C* | 44.6 | 52.0 | 53.6 | 45.8 (Δ 1.2) | 51.8 (Δ −0.2) | 52.1 (Δ −1.5) |
| h | 70.4 | 81.0 | 82.8 | 70.8 (Δ 0.4) | 75.6 (Δ −5.4) | 80.1 (Δ −2.7) |
| Shade (CMC (2:1)) | | | | | | |
| ΔL* | — | 2.4 | 2.5 | — | 1.7 | 2.4 |
| ΔC* | — | 3.1 | 3.7 | — | 2.5 | 2.6 |
| ΔH* | — | 7.9 | 9.3 | — | 3.5 | 6.9 |
| Lightfastness (hrs. to break) | 2–4 | 8 | 8 | 2–4 | 8 | 8 |
| Bleachability (visual rating) | Bleachable | Bleachable | Bleachable | Bleachable | Bleachable | Bleachable |
| Sidedness | Top | — | — | Top | Even | Bottom |

[(1)]CIELAB values in the alkaline dyeings columns include differences ("Δ values") between the acid dyeings values and corresponding alkaline dyeings values.

The data in Table 2, particularly the Δa* and Δh values, show that the dye of the invention prepared as described in Example 1 exhibited much more shade stability to pH changes than did the comparison dyes prepared according to Examples 2 and 3 and is therefore more suitable for coloring paper under alkaline papermaking conditions.

Table 2 also shows that the dye of Example 1 of the invention exhibited desirable top-sidedness in alkaline dyeings, whereas the comparison dye of Example 2 was even-sided and the comparison dye of Example 3 was bottom-sided under the same dyeing conditions.

Although the dye of Example 1 of the invention exhibited relatively lower lightfastness compared to the comparison dyes of Examples 2 and 3, its lighffastness was slightly superior to Direct Yellow 11 (i.e., Standard A; see Table 1) and should be acceptable for the manufacture of kraft brown shades of paper.

Example 4

(comparison)

The method of Example 1 was repeated except for using 46.25 g of catechol (i.e., o-dihydroxybenzene) instead of p-cresol and only the first addition of potassium hydroxide. A slurry instead of a solution was obtained and the nearly insoluble component could not be completely dissolved for testing.

This dye exhibited very poor affinity for the bleached kraft paper and imparted only a very pale yellow color that was much weaker in strength than produced by the dyes of Examples 1–3.

What is claimed is:

1. A dye having the formula

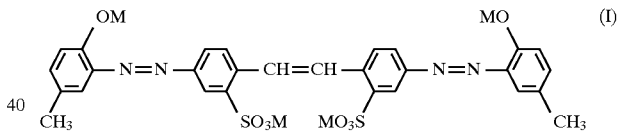

wherein each M is a hydrogen ion, an alkali metal ion, or $R^a R^b R^c R^d N^+$ in which $R^a$, $R^b$, $R^c$, and $R^d$ are independently hydrogen, $C_1$–$C_6$ alkyl, or $C_1$–$C_6$ hydroxyalkyl.

2. A dye according to claim 1 wherein each M is a potassium ion.

3. A method for imparting color to a substrate comprising applying a dye according to claim 1 to said substrate.

4. A method for imparting color to paper, paperboard, or cardboard comprising applying a dye according to claim 1 by an internal or surface dyeing technique to said paper, paperboard, or cardboard.

5. A colored substrate prepared by the method of claim 3.

6. A colored paper, paperboard, or cardboard prepared by the method of claim 4.

* * * * *